United States Patent Office 2,809,219
Patented Oct. 8, 1957

2,809,219

PROCESS FOR HYDROLYZING SULFITE WASTE LIQUOR

Johann Giesen, Haldenstein, Graubunden, Switzerland, assignor to Inventa A. G. fuer Forschung und Patentverwertung, Zurich, Switzerland No Drawing. Application June 15, 1953, Serial No. 361,851

Claims priority, application Switzerland June 16, 1952

1 Claim. (Cl. 260—627)

The present invention relates to a process for hydrolyzing sulfite waste liquor.

Several processes are known for hydrolyzing sulfite waste liquor by hydrogenation under pressure in the presence of catalysts at elevated temperatures. Catalysts used in these processes are iron, cobalt, nickel, copper, molybdenum, palladium and platinum in metallic form or in the form of the difficultly soluble oxides, hydroxides, carbonates, and sulfides.

When using these catalysts, it is necessary to observe very closely a number of accurately defined conditions in order to insure sufficiently high catalyst activity. It is of primary importance to spread the catalyst over a sufficiently large surface in order to allow close contact to occur between catalyst and liquid reactant. However, with a catalyst in a fixed position, the above condition is not easily realized; if, on the other hand, the catalyst is used in suspension, continuous operation is rendered difficult.

It is an object of the present invention to overcome the above mentioned inconveniences of the known processes.

It has been discovered that this can be done by operating in the presence of water-soluble thiomolybdates or thiotungstates; in this way, a thorough hydrolysis and hydrogenation of sulfite waste liquor can be accomplished. In carrying out the process as indicated, the molecular distribution of the dissolved thiomolybdate or thiotungstate brings about a particularly effective catalysis.

The thiomolybdate or thiotungstate to be used may easily be prepared by conventional methods, for instance, by dissolving molybdic acid or tungstic acid in concentrated ammonia water with subsequent introduction of hydrogen sulfide.

The hydrolysis is carried out preferably at temperatures between 250 and 300° C. and pressures of 300–1,000 atm. gauge in neutral aqueous solution. Under these conditions, about 35–50% of the total reaction products are obtained in the form of phenolic oils.

The use of water-soluble catalysts is particularly advantageous when the hydrolysis is carried out continuously. The H$_2$S-containing gases obtained after expansion may be used for preparing or recovering the catalyst.

In the following, the invention will be described in two examples, but it should be understood that these are given by way of illustration and not of limitation and that many modifications of the process may be made without departing from the spirit of the invention.

*Example 1*

To 1,000 cc. sulfite waste liquor neutralized with caustic soda and containing 234 grams of dry lignin, I add 25 grams ammonium thiomolybdate which completely dissolves in the liquor. Heating is carried out in a 2 liter autoclave under hydrogen for 5 hours, the pressure being maintained at 300 atmosphere and the temperature at 250° C.

After cooling, a reaction product is obtained consisting of a tarry, viscous mass and an aqueous portion.

Further work-up yields 65 grams of an oily distillate with 35% of phenols, and 10 grams of oil extracted from the water, consisting mainly of pyrocatechol. Thus, 75 grams of distillabte products are obtained corresponding to 32% of the lignin present in the sulfite waste liquor.

*Example 2*

To 800 cc. sulfite waste liquor neutralized with caustic soda and containing 187 grams of dry lignin, I add 28 grams of ammonium thiotungstate, which completely dissolves in the liquor.

Heating is carried out in a 2 liter autoclave provided with a stirrer in an atmosphere of hydrogen for 4–5 hours, the pressure being maintained at 400 atm. and the temperature at 280° C. After cooling, a pitch-like viscous mass is obtained in addition to an aqueous portion.

Upon further processing, 37 grams of an oily distillate containing 50% of phenols and 13 grams of an oil extracted from the water are obtained, the oil consisting mainly of pyrocatechol. Thus, 50 grams of distillable products are obtained corresponding to 27% of the lignin present in the sulfite waste liquor.

What I claim is:

A process for hydrolyzing and partially hydrogenating sulfite waste liquor, which comprises treating said sulfite waste liquor in a substantially neutral aqueous medium with hydrogen at temperatures ranging from 250 to 300° C. and pressures ranging from 300 to 1000 atm. in the presence of a water-soluble hydrogenation catalyst selected from the group consisting of ammonium thiomolybdate and ammonium thiotungstate, whereby substantial amounts of oily distillates of predominantly phenolic character are obtained.

References Cited in the file of this patent

UNITED STATES PATENTS

| | | |
|---|---|---|
| 2,220,624 | Sherrord et al. | Nov. 5, 1940 |
| 2,278,407 | Anthes et al. | Apr. 7, 1942 |

FOREIGN PATENTS

| | | |
|---|---|---|
| 371,833 | Great Britain | Apr. 21, 1922 |

OTHER REFERENCES

Clark et al.: Tappi, vol. 34 (Jan. 1951), pp. 6 to 11.